United States Patent
Oehring et al.

(10) Patent No.: US 11,674,484 B2
(45) Date of Patent: *Jun. 13, 2023

(54) SYSTEM FOR FUELING ELECTRIC POWERED HYDRAULIC FRACTURING EQUIPMENT WITH MULTIPLE FUEL SOURCES

(71) Applicant: U.S. Well Services, LLC, Houston, TX (US)

(72) Inventors: Jared Oehring, Houston, TX (US); Brandon N. Hinderliter, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/181,546

(22) Filed: Feb. 22, 2021

(65) Prior Publication Data

US 2022/0010758 A1 Jan. 13, 2022

Related U.S. Application Data

(63) Continuation of application No. 15/994,772, filed on May 31, 2018, now Pat. No. 10,927,802, which is a
(Continued)

(51) Int. Cl.
*E21B 43/26* (2006.01)
*F02M 37/32* (2019.01)
(Continued)

(52) U.S. Cl.
CPC ......... *F02M 37/32* (2019.01); *E21B 43/2607* (2020.05); *F02B 43/08* (2013.01);
(Continued)

(58) Field of Classification Search
CPC ...................................................... E21B 43/26
See application file for complete search history.

(56) References Cited

U.S. PATENT DOCUMENTS

| 2,976,025 A | 3/1961 | Pro |
| 3,878,884 A | 4/1975 | Raleigh |

(Continued)

FOREIGN PATENT DOCUMENTS

| CN | 104117308 A | 10/2014 |
| CN | 104196613 A | 12/2014 |

(Continued)

OTHER PUBLICATIONS

Morris et al., U.S. Appl. No. 62/526,869; Hydration-Blender Transport and Electric Power Distribution for Fracturing Operation; filed Jun. 28, 2018; USPTO; see entire document.
(Continued)

*Primary Examiner* — Kenneth L Thompson
(74) *Attorney, Agent, or Firm* — Hogan Lovells US LLP (57) ABSTRACT

A hydraulic fracturing system for fracturing a subterranean formation is disclosed. In an embodiment, the system can include a plurality of electric pumps fluidly connected to a well associated with the subterranean formation and powered by at least one electric motor, and configured to pump fluid into a wellbore associated with the well at a high pressure; at least one generator electrically coupled to the plurality of electric pumps so as to generate electricity for use by the plurality of electric pumps; a gas compression system fluidly coupled to the at least one generator so as to provide fuel for use by the at least one generator; and a combustible fuel vaporization system gaseously coupled to the gas compression system so as to provide at least one of vaporized fuel or gasified fuel, or a combination thereof, to the gas compression system.

8 Claims, 6 Drawing Sheets

Related U.S. Application Data continuation of application No. 15/487,656, filed on Apr. 14, 2017, now Pat. No. 10,020,711, which is a continuation-in-part of application No. 15/235,788, filed on Aug. 12, 2016, which is a continuation-in-part of application No. 15/202,085, filed on Jul. 5, 2016, now Pat. No. 10,337,308, which is a continuation of application No. 13/679,689, filed on Nov. 16, 2012, now Pat. No. 9,410,410.

(60) Provisional application No. 62/323,303, filed on Apr. 15, 2016.

(51) Int. Cl.
| | | |
|---|---|---|
| *F02B 43/08* | (2006.01) | |
| *F02B 43/10* | (2006.01) | |
| *F02B 63/04* | (2006.01) | |
| *H02P 21/00* | (2016.01) | |
| *H02K 7/18* | (2006.01) | |
| *F04B 17/03* | (2006.01) | |
| *F04B 35/04* | (2006.01) | |
| *F04B 47/02* | (2006.01) | |
| *F04B 49/20* | (2006.01) | |
| *H02P 29/024* | (2016.01) | |

(52) U.S. Cl.
CPC ............. *F02B 43/10* (2013.01); *F02B 63/04* (2013.01); *F04B 17/03* (2013.01); *F04B 35/04* (2013.01); *F04B 47/02* (2013.01); *F04B 49/20* (2013.01); *H02K 7/1815* (2013.01); *H02K 7/1823* (2013.01); *H02P 21/00* (2013.01); *H02P 29/0241* (2016.02); *F02B 2043/103* (2013.01)

(56) References Cited

U.S. PATENT DOCUMENTS

| | | | |
|---|---|---|---|
| 4,411,313 | A | 10/1983 | Johnson et al. |
| 4,538,916 | A | 9/1985 | Zimmerman |
| 4,601,629 | A | 7/1986 | Zimmerman |
| 4,768,884 | A | 9/1988 | Elkin |
| 5,114,239 | A | 5/1992 | Allen |
| 5,334,899 | A | 8/1994 | Skybyk |
| 5,439,066 | A | 8/1995 | Gipson |
| 5,486,047 | A | 1/1996 | Zimmerman |
| 5,798,596 | A | 8/1998 | Lordo |
| 5,813,455 | A | 9/1998 | Pratt et al. |
| 5,950,726 | A | 9/1999 | Roberts |
| 6,035,265 | A | 3/2000 | Dister et al. |
| 6,097,310 | A | 8/2000 | Harrell et al. |
| 6,121,705 | A | 9/2000 | Hoong |
| 6,273,193 | B1 | 8/2001 | Hermann et al. |
| 6,442,942 | B1 | 9/2002 | Kopko |
| 6,585,455 | B1 | 7/2003 | Petersen et al. |
| 6,788,022 | B2 | 9/2004 | Sopko |
| 6,985,750 | B1 | 1/2006 | Vicknair et al. |
| 7,795,830 | B2 | 9/2010 | Johnson |
| 9,062,545 | B2 | 6/2015 | Roberts et al. |
| 9,140,105 | B2 | 9/2015 | Pattillo |
| 9,353,593 | B1 | 5/2016 | Lu et al. |
| 9,506,333 | B2 | 11/2016 | Castillo et al. |
| 9,790,858 | B2 | 10/2017 | Kanebako |
| 9,945,365 | B2 | 4/2018 | Hernandez et al. |
| 10,020,711 | B2 * | 7/2018 | Oehring .................. F02B 63/04 |
| 10,221,639 | B2 | 3/2019 | Romer et al. |
| 10,408,030 | B2 | 9/2019 | Oehring et al. |
| 10,408,031 | B2 | 9/2019 | Oehring et al. |
| 10,415,332 | B2 | 9/2019 | Morris et al. |
| 10,648,270 | B2 | 5/2020 | Brunty et al. |
| 10,648,311 | B2 | 5/2020 | Oehring et al. |
| 10,686,301 | B2 | 6/2020 | Oehring et al. |
| 10,731,561 | B2 | 8/2020 | Oehring et al. |
| 10,740,730 | B2 | 8/2020 | Altamirano et al. |
| 10,767,561 | B2 | 9/2020 | Brady |
| 10,781,752 | B2 | 9/2020 | Kikkawa et al. |
| 10,794,165 | B2 | 10/2020 | Fischer et al. |
| 10,927,802 | B2 * | 2/2021 | Oehring .............. H02P 29/0241 |
| 10,988,998 | B2 | 4/2021 | Fischer et al. |
| 2001/0000996 | A1 | 5/2001 | Grimland et al. |
| 2004/0045703 | A1 | 3/2004 | Hooper et al. |
| 2005/0201197 | A1 | 9/2005 | Duell et al. |
| 2006/0109141 | A1 | 5/2006 | Huang |
| 2008/0164023 | A1 | 7/2008 | Dykstra et al. |
| 2008/0257449 | A1 | 10/2008 | Weinstein et al. |
| 2008/0277120 | A1 | 11/2008 | Hickie |
| 2009/0072645 | A1 | 3/2009 | Quere |
| 2011/0081268 | A1 | 4/2011 | Ochoa et al. |
| 2011/0110793 | A1 | 5/2011 | Leugemors et al. |
| 2012/0063936 | A1 | 3/2012 | Baxter et al. |
| 2012/0112757 | A1 | 5/2012 | Vrankovic et al. |
| 2012/0150455 | A1 | 6/2012 | Franklin et al. |
| 2013/0051971 | A1 | 2/2013 | Wyse et al. |
| 2013/0284455 | A1 | 10/2013 | Kajaria et al. |
| 2014/0174717 | A1 | 6/2014 | Broussard et al. |
| 2015/0147194 | A1 | 5/2015 | Foote |
| 2015/0233530 | A1 | 8/2015 | Sandidge |
| 2016/0006311 | A1 | 1/2016 | Li |
| 2016/0230660 | A1 | 8/2016 | Zeitoun et al. |
| 2016/0326853 | A1 | 11/2016 | Fred et al. |
| 2017/0082033 | A1 | 3/2017 | Wu et al. |
| 2017/0096889 | A1 | 4/2017 | Blanckaert et al. |
| 2017/0204852 | A1 | 7/2017 | Barnett |
| 2017/0212535 | A1 | 7/2017 | Shelman et al. |
| 2017/0370639 | A1 | 12/2017 | Barden et al. |
| 2018/0090914 | A1 | 3/2018 | Johnson et al. |
| 2018/0181830 | A1 | 6/2018 | Laharuka et al. |
| 2018/0259080 | A1 | 9/2018 | Dale et al. |
| 2018/0266217 | A1 | 9/2018 | Funkhauser et al. |
| 2018/0284817 | A1 | 10/2018 | Cook et al. |
| 2018/0298731 | A1 | 10/2018 | Bishop |
| 2018/0312738 | A1 | 11/2018 | Rutsch et al. |
| 2018/0313677 | A1 | 11/2018 | Warren et al. |
| 2018/0363640 | A1 | 12/2018 | Kajita et al. |
| 2018/0366950 | A1 | 12/2018 | Pedersen et al. |
| 2019/0040727 | A1 | 2/2019 | Oehring et al. |
| 2019/0128104 | A1 | 5/2019 | Graham et al. |
| 2019/0145251 | A1 | 5/2019 | Johnson |
| 2019/0154020 | A1 | 5/2019 | Glass |
| 2019/0249527 | A1 | 8/2019 | Kraynek |
| 2019/0257462 | A1 | 8/2019 | Rogers |
| 2020/0040878 | A1 | 2/2020 | Morris |
| 2020/0325760 | A1 | 10/2020 | Markham |
| 2020/0350790 | A1 | 11/2020 | Luft et al. |

FOREIGN PATENT DOCUMENTS

| | | |
|---|---|---|
| CN | 112196508 A | 1/2021 |
| WO | 2009046280 | 4/2009 |
| WO | 2014177346 | 11/2014 |
| WO | 2018044307 A1 | 3/2018 |
| WO | 2018213925 A1 | 11/2018 |
| WO | 2019210417 | 11/2019 |

OTHER PUBLICATIONS

Final Office Action dated Feb. 4, 2021 in U.S. Appl. No. 16/597,014.
International Search Report and Written Opinion dated Feb. 4, 2021 in PCT/US20/59834.
International Search Report and Written Opinion dated Feb. 2, 2021 in PCT/US20/58906.
International Search Report and Written Opinion dated Feb. 3, 2021 in PCT/US20/58899.
Non-Final Office Action dated Jan. 29, 2021 in U.S. Appl. No. 16/564,185.
Final Office Action dated Jan. 21, 2021 in U.S. Appl. No. 16/458,696.
Final Office Action dated Jan. 11, 2021 in U.S. Appl. No. 16/404,283.
Non-Final Office Action dated Jan. 4, 2021 in U.S. Appl. No. 16/522,043.
International Search Report and Written Opinion dated Dec. 14, 2020 in PCT/US2020/53980.

(56) References Cited

OTHER PUBLICATIONS

Non-Final Office Action issued in U.S. Appl. No. 16/871,928 dated Aug. 25, 2021.
Non-Final Office Action issued in U.S. Appl. No. 16/943,727 dated Aug. 3, 2021.
Non-Final Office Action issued in U.S. Appl. No. 14/881,525 dated Jul. 21, 2021.
Non-Final Office Action issued in U.S. Appl. No. 16/404,283 dated Jul. 21, 2021.
Notice of Allowance and Notice of Allowability issued in U.S. Appl. No. 15/829,419 dated Jul. 26, 2021.
Woodbury et al., "Electrical Design Considerations for Drilling Rigs," IEEE Transactions on Industry Applications, vol. 1A-12, No. 4, Jul./Aug. 1976, pp. 421-431.
Kroposki et al., Making Microgrids Work, 6 IEEE Power and Energy Mag. 40, 41 (2008).
Dan T. Ton & Merrill A. Smith, The U.S Department of Energy's Microgrid Initiative, 25 the Electricity J 84 (2012), pp. 84-94.
Non-Final Office Action issued in U.S. Appl. No. 16/871,328 dated Dec. 9, 2021.
Non-Final Office Action issued in U.S. Appl. No. 16/943,935 dated Oct. 21, 2021.
Non-Final Office Action issued in U.S. Appl. No. 16/564,186, dated Oct. 15, 2021.
Final Office Action issued in U.S. Appl. No. 16/356,263 dated Oct. 7, 2021.
Non-Final Office Action issued in U.S. Appl. No. 17/060,647 dated Sep. 20, 2021.
Non-Final Office Action issued in U.S. Appl. No. 16/901,774 dated Sep. 14, 2021.
Canadian Office Action issued in Canadian Application No. 3,094,768 dated Oct. 28, 2021.
International Search Report and Written Opinion mailed in PCT/US20/67526 dated May 6, 2021.
International Search Report and Written Opinion mailed in PCT/US20/67608 dated Mar. 30, 2021.
International Search Report and Written Opinion mailed in PCT/US20/67528 dated Mar. 19, 2021.
International Search Report and Written Opinion mailed in PCT/US20/67146 dated Mar. 29, 2021.
International Search Report and Written Opinion mailed in PCT/US20/67523 dated Mar. 22, 2021.
International Search Report and Written Opinion mailed in PCT/US2020/066543 dated May 11, 2021.

\* cited by examiner

SYSTEM FOR FUELING ELECTRIC POWERED HYDRAULIC FRACTURING EQUIPMENT WITH MULTIPLE FUEL SOURCES

CROSS REFERENCE TO RELATED APPLICATIONS

This application is a continuation of U.S. patent application Ser. No. 15/994,772, filed May 31, 2018, and is a continuation of U.S. patent application Ser. No. 15/487,656, filed Apr. 14, 2017, and claims priority to and the benefit of U.S. Provisional Patent Application No. 62/323,303, filed Apr. 15, 2016, and is a continuation-in-part of, and claims priority to and the benefit of, co-pending U.S. patent application Ser. No. 15/235,788, filed Aug. 12, 2016, which is in turn a continuation-in-part of, and claims priority to and the benefit of, co-pending U.S. patent application Ser. No. 15/202,085, filed Jul. 5, 2016, which is a continuation of, and claims priority to and the benefit of, U.S. patent application Ser. No. 13/679,689, filed Nov. 16, 2012, now U.S. Pat. No. 9,410,410, issued Aug. 9, 2016, the full disclosures of which are hereby incorporated by reference herein for all purposes.

BACKGROUND

1. Technical Field

This disclosure relates generally to hydraulic fracturing and more particularly to systems and methods for fueling electric powered hydraulic fracturing equipment using turbine generators fueled by multiple fuel sources.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing operations typically require powering numerous components in order to recover oil and gas resources from the ground. For example, hydraulic fracturing usually includes pumps that inject fracturing fluid down the wellbore, blenders that mix proppant into the fluid, cranes, wireline units, and many other components that all must perform different functions to carry out fracturing operations.

Usually in fracturing systems, the fracturing equipment is powered by large diesel motors or by other internal combustion engines. Such engines may be very powerful, but have certain disadvantages. Diesel is more expensive, is less environmentally friendly, less safe, and heavier to transport than natural gas. For example, diesel engines are very heavy, and so require the use of a large amount of heavy equipment, including trailers and trucks, to transport the engines to and from a well site. In addition, such engines are not clean, generating large amounts of exhaust and pollutants that may cause environmental hazards, and are extremely loud, among other problems. Onsite refueling, especially during operations, presents increased risks of fuel leaks, fires, and other accidents. The large amounts of diesel fuel needed to power traditional fracturing operations require constant transportation and delivery by diesel tankers onto the well site, resulting in significant carbon dioxide emissions.

Some systems have tried to eliminate partial reliance on diesel by creating bi-fuel systems. These systems blend natural gas and diesel, but have not been very successful. It is thus desirable that a natural gas powered fracturing system be used in order to improve safety, save costs, and provide benefits to the environment over diesel powered systems. Turbine use is well known as a power source, but is not typically employed for powering fracturing operations.

Though less expensive to operate, safer, and more environmentally friendly, turbine generators come with their own limitations and difficulties as well. Most turbines are configured only to be fueled by natural gas, and the associated gas compression systems are typically only capable of handling natural gas to feed the turbines.

Thus, it may be desirable to modify turbine operation in order to expand operability of the turbines.

SUMMARY

The present disclosure is directed to a system and method for fueling one or more turbines using a variety of fuel sources besides natural gas, including liquid fuels and gasified solid fuels. The fueled turbines are then used to power electric hydraulic fracturing equipment.

In accordance with an aspect of the disclosed subject matter, the method and system of the present disclosure provide a hydraulic fracturing system for fracturing a subterranean formation. In an embodiment, the system can include a plurality of electric pumps fluidly connected to a well associated with the subterranean formation and powered by at least one electric motor, and configured to pump fluid into a wellbore associated with the well at a high pressure so that the fluid passes from the wellbore into the subterranean formation and fractures the subterranean formation; at least one generator electrically coupled to the plurality of electric pumps so as to generate electricity for use by the plurality of electric pumps; a gas compression system fluidly coupled to the at least one generator so as to provide fuel for use by the at least one generator; and a combustible fuel vaporization system gaseously coupled to the gas compression system so as to provide at least one of vaporized fuel or gasified fuel, or a combination thereof, to the gas compression system.

In an embodiment, the system can further include at least one of a liquid fuel source or a solid fuel source. In an embodiment, each of the liquid fuel source and the solid fuel source can be configured to supply fuel to the combustible fuel vaporization system.

In an embodiment, each of the liquid fuel source and the solid fuel source can include at least one of a hydrogen-based, hydrocarbon-based, or alcohol-based fuel source, or any combination thereof.

In an embodiment, the liquid fuel source can include any of a kerosene, methanol, No. 2 fuel oil, hydrogen, liquefied natural gas (LNG), substitute natural gas (SNG), liquid hydrocarbon, or ammonia fuel source, or any combination thereof.

In an embodiment, the solid fuel source can include any of a wood gas or coal gas fuel source, or a combination thereof.

In an embodiment, the system can further include an inert gas source, wherein an inert gas is provided to regulate the liquid fuel source or the solid fuel source prior to providing fuel for use by the at least one generator.

In an embodiment, the inert gas source can include at least one of an oxygen-lean or a nitrogen-rich inert gas source, or a combination thereof.

In an embodiment, the system can further include at least one filter configured to filter at least one of particulates, water, or condensate, or a combination thereof, from at least one of the liquid fuel source and the solid fuel source.

In an embodiment, the system can further include a vaporized gas heating system in gaseous communication with the combustible fuel vaporization system so as to prevent the vaporized gas from cooling to below a condensation point associated with the vaporized gas.

In an embodiment, the vaporized gas heating system can be powered by the at least one generator.

In an embodiment, the system can further include a variable frequency drive connected to the at least one electric motor to control the speed of the at least one electric motor, wherein the variable frequency drive can frequently perform electric motor diagnostics to prevent damage to the at least one electric motor.

In an embodiment, the at least one generator can include one of a turbine generator or a reciprocating engine generator, or a combination thereof.

In accordance with another aspect of the disclosed subject matter, the method and system of the present disclosure provide a hydraulic fracturing system for fracturing a subterranean formation. In an embodiment, the system can include a plurality of electric pumps fluidly connected to a well associated with the subterranean formation and powered by at least one electric motor, and configured to pump fluid into a wellbore associated with the well at a high pressure so that the fluid passes from the wellbore into the subterranean formation and fractures the subterranean formation; at least one turbine generator electrically coupled to the plurality of electric pumps so as to generate electricity for use by the plurality of electric pumps; a gas compression system fluidly coupled to the at least one turbine generator so as to provide fuel for use by the at least one turbine generator; a combustible fuel vaporization system gaseously coupled to the gas compression system so as to provide at least one of vaporized fuel or gasified fuel, or a combination thereof, to the gas compression system; and a variable frequency drive connected to the at least one electric motor to control the speed of the at least one electric motor, wherein the variable frequency drive frequently performs electric motor diagnostics to prevent damage to the at least one electric motor.

Other aspects and features of the present disclosure will become apparent to those of ordinary skill in the art after reading the detailed description herein and the accompanying figures.

BRIEF DESCRIPTION OF DRAWINGS

Some of the features and benefits of the present disclosure having been stated, others will become apparent as the description proceeds when taken in conjunction with the accompanying drawings, in which.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION OF DISCLOSURE

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Described herein are example methods and systems for fueling electricity generating turbines with multiple fuel sources, where the turbines provide power to electric hydraulic fracturing equipment.

Figure 1:
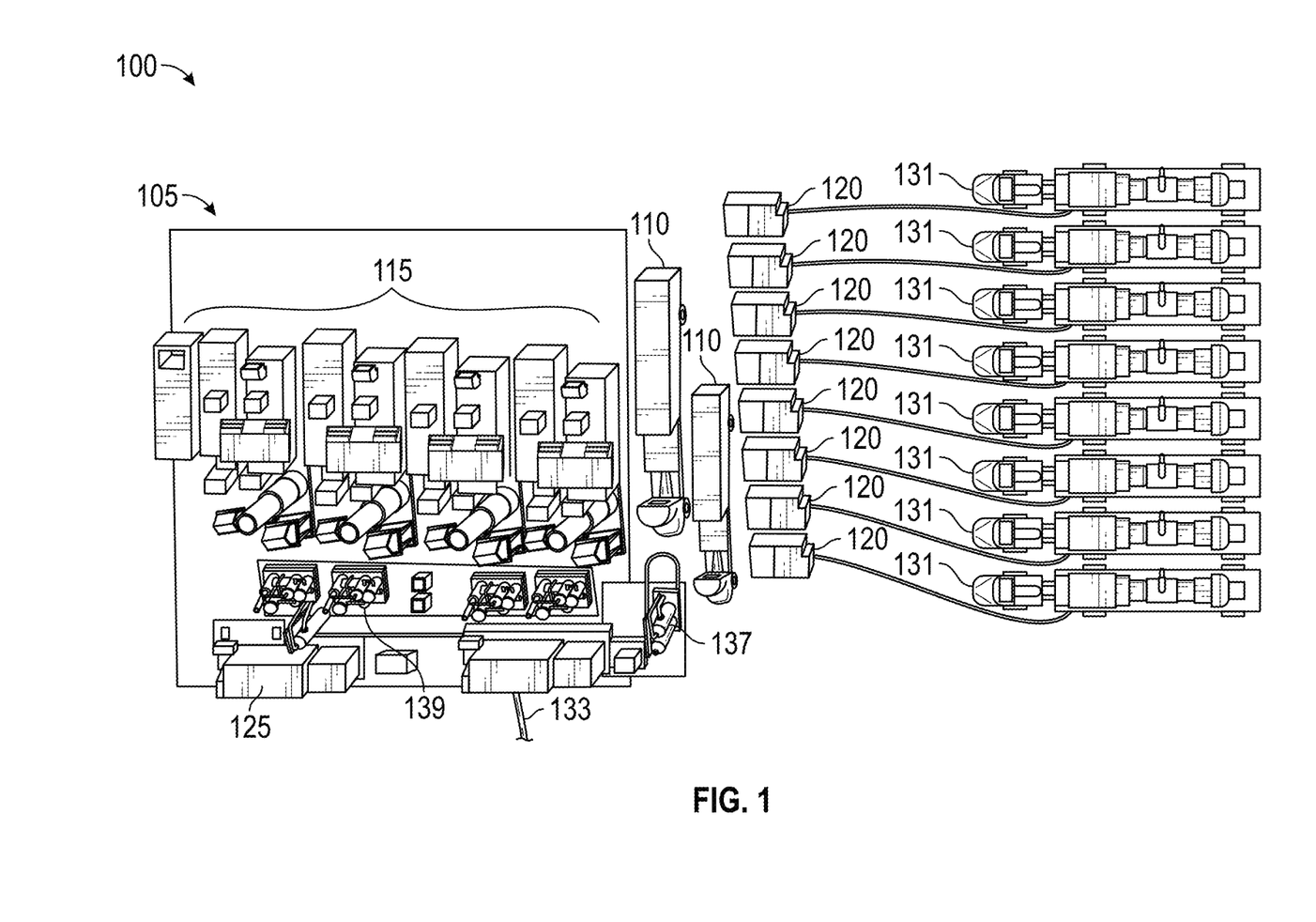
FIG. 1 is an overhead perspective view of an example of a power generation system for a hydraulic fracturing system having power generating turbines and gas compression according to an embodiment of the disclosure.

FIG. 1 shows in an overhead perspective view of an example 100 of a power generation system 105 for hydraulic fracturing having power generating turbines and gas compression functionality. In the illustrated embodiment, gas can enter through main gas line 133, and enter one or more compressors 125. In some examples, compressed gas can flow through one or more sand trap and separator 137, and through one or more filter 139, before being provided to power the one or more turbines 115. Switch gear units 110 can be disposed in elongated trailers located adjacent to the turbines 115, and 13.8 kV to 600 V transformers 120 are shown arranged on a side of the switch gear units 110 opposite the turbines 115. Fracturing pump units 131 can be positioned adjacent to, and electrically coupled with, the transformers 120. Additional components (not shown) of a hydraulic fracturing system can include flowback tanks, pressure relief tanks, well heads, control units, sand silos, a data van, and mixing equipment such as blenders and a hydration unit.

In a method or system according to an embodiment of the present disclosure, vaporized liquid fuels and/or gasified solid fuels that are hydrogen-, hydrocarbon-, or alcohol-based can be utilized to fuel one or more electricity generating turbines for a hydraulic fracturing system. A combustible liquid fuel vaporization system can be used along with an existing gas compression system to allow the turbines to utilize multiple types of combustible liquids. The ability to power the turbines with various different combustible liquids will provide the option to use the cheapest available fuels based on market price, or to use renewable biofuels to achieve a "greener" image for hydraulic fracturing. The capability to vaporize liquid fuels also allows for fuel storage on well sites in the liquid form as a reserve to use as needed. This will save money and help prevent downtime during operations.

In a non-limiting example of operation, gas can be fed into the inlets of the compressors at approximately 90 psi. However, if required, the system can work on a suction pressure range of 35 psi to 180 psi. Gas can be supplied to the system from a sales line, gas wellhead, storage tank, or mobile transport(s), or alternatively from a customer compressor station at approximately 100 psi to 200 psi. The system can also optionally include two or more three-phase separators and one or more sand traps to filter out large particulates and the majority of the water and condensate that is carried in pre-refined natural gas before delivering the fuel to the turbines.

Example pressures for fuel exiting the compressors can range from about 150 psi to 380 psi, and can have a normal case discharge pressure of about 300 psi. Downstream of the compressors, the high pressure gas can be routed through a final filtration process to be conditioned for the turbines. Several manifolds can be in place on both the high pressure and low pressure sides of the system, in order to correctly route the fuel. This configuration has the advantage of keeping all of the turbines on a single fuel rail, such that if a single compressor fails, the other compressor(s) can still supply gas to all of the turbines.

Examples of voltages of electricity generated by properly fueled turbines include 13.8 kV, 480 V, 600 V, and 4,160 V, which can be three-phase electricity with a +/−10% voltage adjustment range. Optionally, multiple 5.7 MW turbines are used to supply enough electrical power to the fracturing system. Other mobile turbine generator configurations are possible as well, including turbines that are rated to output power in a range of 1 MW per turbine to 50 MW per turbine. Another possible configuration includes a single 25 MW turbine to provide power, with a smaller secondary turbine rated for 5.7 MW for auxiliary power or starting power. In an embodiment, a variable frequency drive (VFD) can be utilized to control the speed of an electric motor associated with a pump powered by the turbine(s).

Example fuels include liquid fuels such as kerosene, methanol, No. 2 fuel oil, hydrogen, liquefied natural gas (LNG), ammonia, and the like, and combinations thereof; and gasified solid fuels such as wood gas or coal gas.

Optionally included with the fuel supply system is a liquid vaporization skid, which in one example can accommodate liquid hydrocarbon fuel such as (but not limited to) kerosene, diesel, biodiesel, gasoline, low viscosity fuel oils, and liquid petroleum (LP) gas. Alcohol fuels (chemically or biologically produced) such as methanol, ethanol, butanol, and propanol (among others); or mixtures such as E5, E10 (gasohol), E15, E85, hE15 (uses hydrous ethanol with excess water), ED95 (has a lowered ignition point designed to be used with diesel motors), any other common or uncommon ratio of ethanol and gasoline, Ecalene (an alcohol fuel mixture composed of ethanol, methanol, propanol, butanol, and hexanol), and any other alcohol and/or hydrocarbon mixtures, can also be used. Embodiments exist where the fuel system uses liquid hydrogen as an alternative fuel. In an embodiment, synthetic natural gas or substitute natural gas ("SNG") can be formed by vaporizing the hydrocarbon fuels. Further optionally, the SNG can be compressed to a designated pressure range for use by the turbines, and can be burned as a fuel source to power the generator for the production of electricity.

An inert gas can be used to regulate the new SNG fuel before it reaches the turbines to avoid the need to modify the turbines with new hardware (such as fuel injectors) and software to control a more or less combustible fuel source. Most vaporized fuels will contain more or less energy than natural gas. Hydrocarbons with more carbon in the molecule have a higher heating value, and propane ($C_3H_8$) has nearly three times the energy density of methane ($CH_4$). This large difference in energy can be regulated without modifying the turbines by using air that has some oxygen content removed and has a larger percentage of nitrogen. For example, ambient air includes, by volume, approximately 78% nitrogen ($N_2$), 21% oxygen ($O_2$) and 1% argon (Ar), with other trace gases. An example of a low oxygen, high nitrogen content includes air having about 13% by volume of oxygen and about 86% by volume of nitrogen.

An air separator can be used to reduce the oxygen volumetric percentage and elevate the nitrogen volumetric percentage in an inert gas. Depending on the energy content of the vaporized fuel, either gas could be used to regulate the fuel for combustion in the turbine. The oxygen rich gas can even be used to reduce emissions after the fuel is burned in the turbine's combustion chamber.

Liquefied natural gas ("LNG") can be vaporized into natural gas to be used as well, which may advantageously provide the ability to transport and store natural gas on well sites lacking a natural gas line to supply fuel. To prevent vaporized gas from cooling to below its condensation point and liquefying upstream of the turbines, oxygen-lean gas can be heated before the premixing process in the vaporizer unit to help carry the fuel to its destination. Heaters on the pipes can also be utilized to keep the gas route warm enough so the vapor does not condense. In an embodiment, electric heaters can be powered by the turbines when the turbines are running, and by a standby generator (black start generator) if the turbines have not yet been started.

In an embodiment, LNG can be used as a fuel for the turbines if a supply of natural gas is inadequate or unavailable at a well site by utilizing a refillable LNG skid with a built-in vaporizer. In this example, the vaporizer can convert the liquid LNG to vapor, which can then be supplied to the gas compression system to feed the turbines. With this option, one or more LNG vaporization skids can be used instead of the natural gas supply pipeline, resulting in nominal fuel gas conditioning and premixing. Moreover, gas energy content can be minimally regulated as a large oxygen separator may not be used to enrich or downgrade the fuel gas mixture.

Another embodiment allows for the use of any liquid fuel instead of LNG alone, and may not require use of the LNG vaporizer. In examples where a liquid fuel vaporization system is already in use for other non-hydraulic fracturing applications, the liquid fuel vaporization system can be integrated into the gas compression system. This configuration can allow the turbines powering the electric hydraulic fracturing equipment to be fueled by any of the sources discussed herein. In this example, the fuel gas can be regulated with lean premixing to produce a synthetic natural gas having an energy content similar to that of methane-based natural gas.

Figure 2:
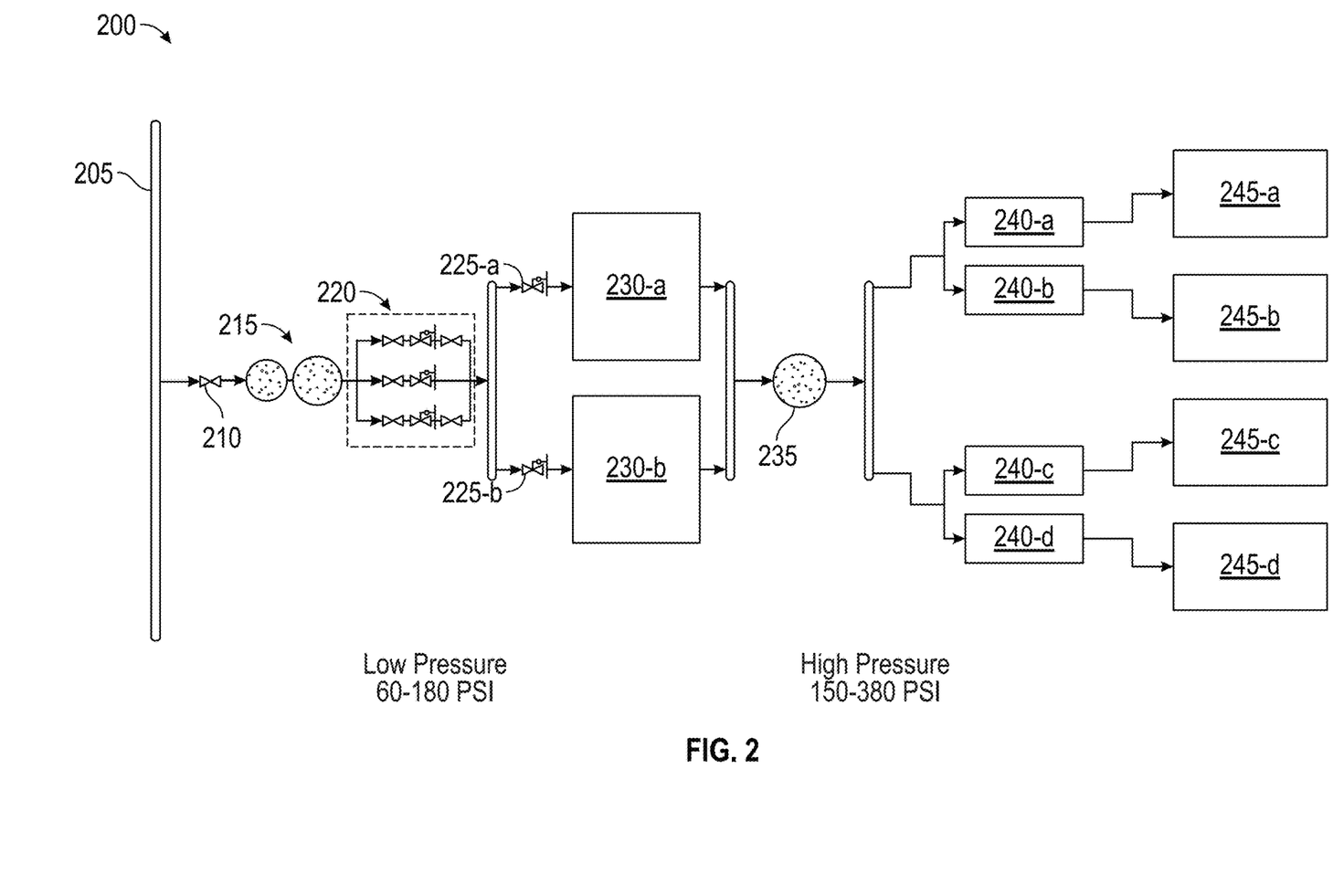
FIG. 2 is a schematic example of a gas compression system according to an embodiment of the disclosure.

FIG. 2 shows a block diagram of a schematic example of a gas compression system 200 according to an embodiment. A main gas supply line 205, as illustrated in an embodiment shown in FIG. 2, extends along a lateral side of the system, allowing gas from the main gas supply line 205 to flow through shutoff valve 210, and through filtration vessels including a three-phase separator and sand trap 215, in order to filter at least one of particulate, water, or condensate from the gas. From there, the filtered gas can flow into a pressure regulation skid 220, where the gas can be prepared for the gas compression units 230-a, 230-b.

One example of a gas compression system 200 can rely on one or more fuel gas compression units 230-a, 230-b capable of supplying up to 5,000 MCF of fuel gas per day to a plurality of natural gas-fueled electric turbines 245-a, 245-b, 245-c, 245-d. In an embodiment, the system 200 can include multiple gas pressure regulators, including an entire skid dedicated to pressure regulation 220. In an embodiment, the pressure regulation skid 220 can regulate the pressure of incoming fuel at a low pressure in the range of 60-180 pounds per square inch (PSI). In an embodiment, the pressure regulation skid 220 can contain three regulator conduits, with the center regulator conduit being closed and held in reserve in the event of failure of a primary regulator, valve, fitting, or pipe. The system can be capable of being supplied from a single regulator if necessary. Several more individual valves and regulators 210, 225-a, 225-b can be placed upstream and downstream of the regulation skid 220, one on each inlet to the compressors 230-a, 230-b or in any other combination, to further reduce the suction gas pressure, if required.

Gas at a regulated pressure can exit pressure regulator skid 220 and enter a manifold for the compressor inlet before entering gas compression units 230-a, 230-b. After being boosted from the gas compression units 230-a, 230-b, the gas can flow through a manifold for the compressor outlet and through another three-phase separator 235, through a manifold for the filtration inlet into the final gas filtration skids 240-a, 240-b, 240-c, 240-d to filter any remaining impurities from the gas and to heat the gas to 50 degrees Fahrenheit above the condensation point for that gas, then into the turbines 245-a, 245-b, 245-c, 245-d at a high pressure in the range of 150-380 PSI, and at approximately 300 PSI in the illustrated embodiment, to power the turbines 245-a, 245-b, 245-c, 245-d. In some embodiments two or more gas filtration skids 240-a, 240-b, 240-c, 240-d may be grouped on one or more trailers at the well site.

Figure 3:
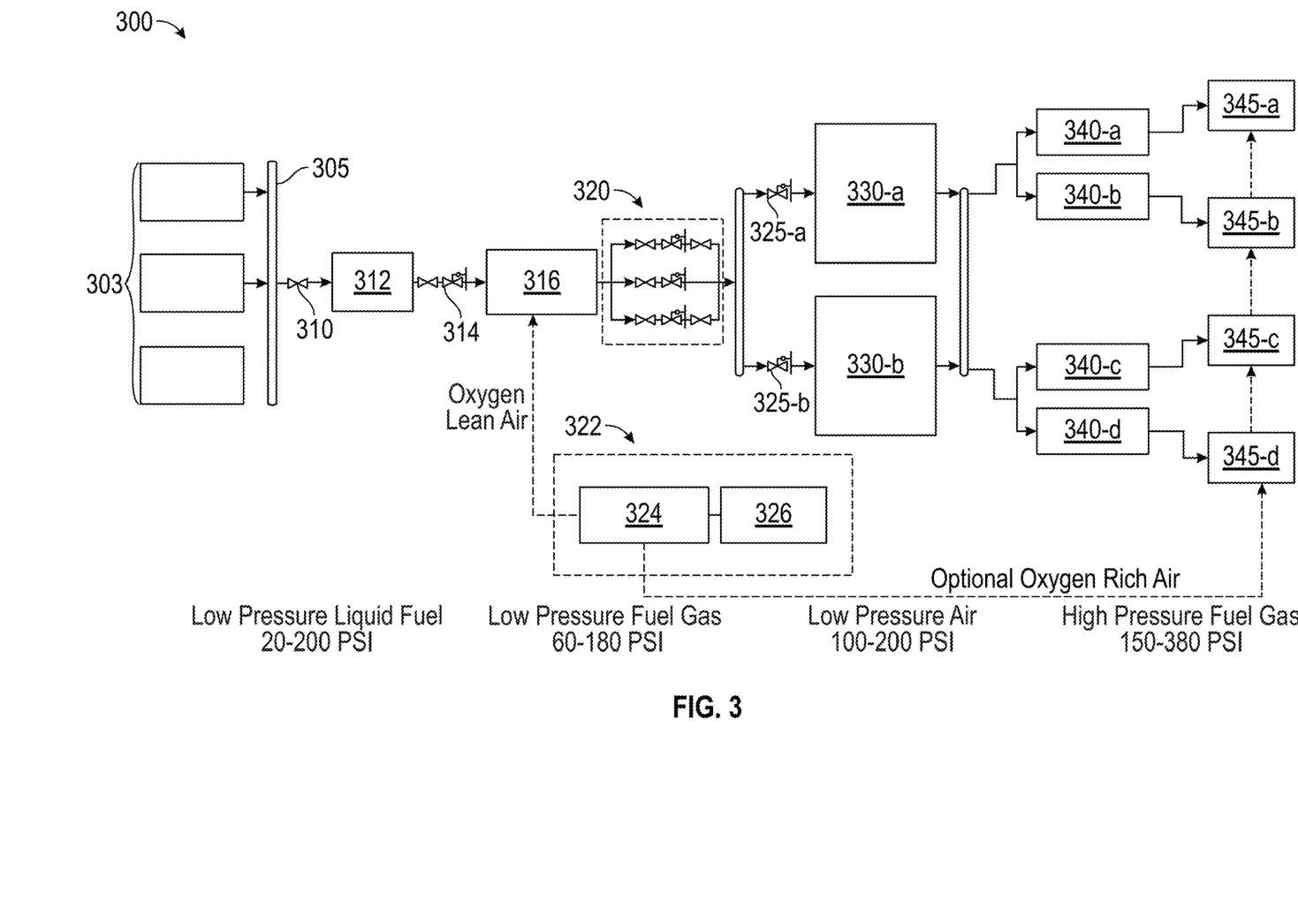
FIG. 3 is a schematic block diagram of an example of a gas compression system having a liquid fuel vaporization system according to an embodiment of the disclosure.

Shown in schematic block diagram form in FIG. 3 is an example of a gas compression system 300 having a liquid fuel vaporization system 316. In the illustrated example, instead of a main gas supply (as is shown in FIG. 2), gas compression system 300 can include a manifold 305 for connecting and unloading liquid fuel delivery tankers 303. In fluid communication with the manifold 305 is an optional fuel storage vessel 312, which can receive fluid from the liquid fuel delivery tankers 303 via shutoff valve 310. The storage vessel 312 can prevent downtime if there is an interruption in fuel deliveries. Fuel can be received at and stored in the storage vessel 312 in a low pressure liquid form in the range of 20-200 PSI in some embodiments.

In some embodiments, liquid fuel can be purified prior to delivery, such that use of filtration vessels, such as a three-phase separator and sand trap 215 as illustrated in FIG. 2, is not necessary. In other embodiments, filtration vessels may be added to the gas compression system 300.

Downstream from the fuel storage vessel 312, as part of the fuel vaporizing and premixing system, can be a fuel vaporization skid 316, which can receive liquid fuel and vaporize the liquid fuel into a gaseous state. In the gaseous state, the fuel can remain at a low pressure, in the range of 60-180 PSI, according to an embodiment. Oxygen-lean air can be injected into the vaporization skid 316 from a line shown connecting to an oxygen separation skid 322. An air compressor 324 can be included with the oxygen separation skid 322 for urging the air into the vaporization skid 316, and an air separator 326 can be provided for separating the oxygen from the air. Adding oxygen-lean air to regulate the energy of the new SNG or other fuel forms a gas similar to methane-based natural gas. Optionally, the separated oxygen can be sent to the turbines 345-a, 345-b, 345-c, 345-d in the form of oxygen-rich air to help aid in combustion or to reduce the emissions of exhaust gases produced during operation of the turbines 345-a, 345-b, 345-c, 345-d.

If required, extra pressure regulation or fuel filtering can be applied to any embodiment. Fuel filtering can include three-phase separators and sand traps for liquid or gaseous fuels, as illustrated in the embodiment shown in FIG. 2.

Regulators can be in the form of a specialized unit containing multiple regulators and bypass or isolation valves, such as pressure regulator skid 320, or can be individual regulators 314, 325-a, 325-b spread throughout the compression system. Each piece of equipment can contain dedicated internal pressure regulators.

Valves 310 are optionally provided at the fuel inlets and outlets to each piece of equipment, and further optionally to parts of the internal plumbing to enable fuel to be shut off at any point in the vaporization and compression system. Some of these valves can be manual, while others can be actuated and controlled either digitally or by an automatic control system. Filtration units can also provide heating to the gaseous fuels. In an embodiment, these filtration units can heat the fuel mixture to 50 degrees Fahrenheit above the dew point of the fuel to allow further conditioning of the gas for the turbines and to allow the gas to remain mixed and uncondensed, and to combust properly in the combustion chamber.

Like the system 200 of FIG. 2, the gas compression system 300 of FIG. 3 includes gas compression units 330-a, 330-b, turbines 345-a, 345-b, 345-c, 345-d downstream of the gas compression units 330-a, 330-b, and filtration units 340-a, 340-b, 340-c, 340-d between the gas compression units 330-a, 330-b and turbines 345-a, 345-b, 345-c, 345-d. Unlike the system of FIG. 2, a three-phase separator is not provided downstream of the compressors in an embodiment illustrated in FIG. 3. However, the three-phase separators and sand trap(s) can be included in the embodiment illustrated in FIG. 3 if the fuel has a high amount of undesirable water or particulate matter.

A possible problem could arise if the vaporized fuel source has a higher energy content than natural gas. To overcome this, the vaporized fuel can be mixed with reduced-oxygen gas to lower the energy of the newly vaporized fuel to a level equivalent to that of natural gas. The reduced oxygen gas can be derived from an oxygen separation skid 322, from exhaust gases produced by the turbines 345-a, 345-b, 345-c, 345-d, or from any other exhaust gas-producing equipment. Another option lies with the turbines 345-a, 345-b, 345-c, 345-d themselves, in that the fuel distribution system and premixing within the turbines can be modified to operate with the higher or lower energy content of the vaporized gas. This configuration may require a hardware and software change, however, which is not desirable and can be expensive, time consuming, and limiting.

The fuel can spontaneously ignite before reaching the combustion chamber of the turbines 345-a, 345-b, 345-c, 345-d in an event typically referred to as auto-ignition. This premature detonation can be damaging to the turbine and can increase emissions. By mixing the fuel with an inert gas or lower oxygen gas, auto-ignition can be delayed or prevented. While ambient air has approximately 21% oxygen content, reducing the oxygen level to below 13% can greatly reduce the chances of auto ignition.

Figure 4:
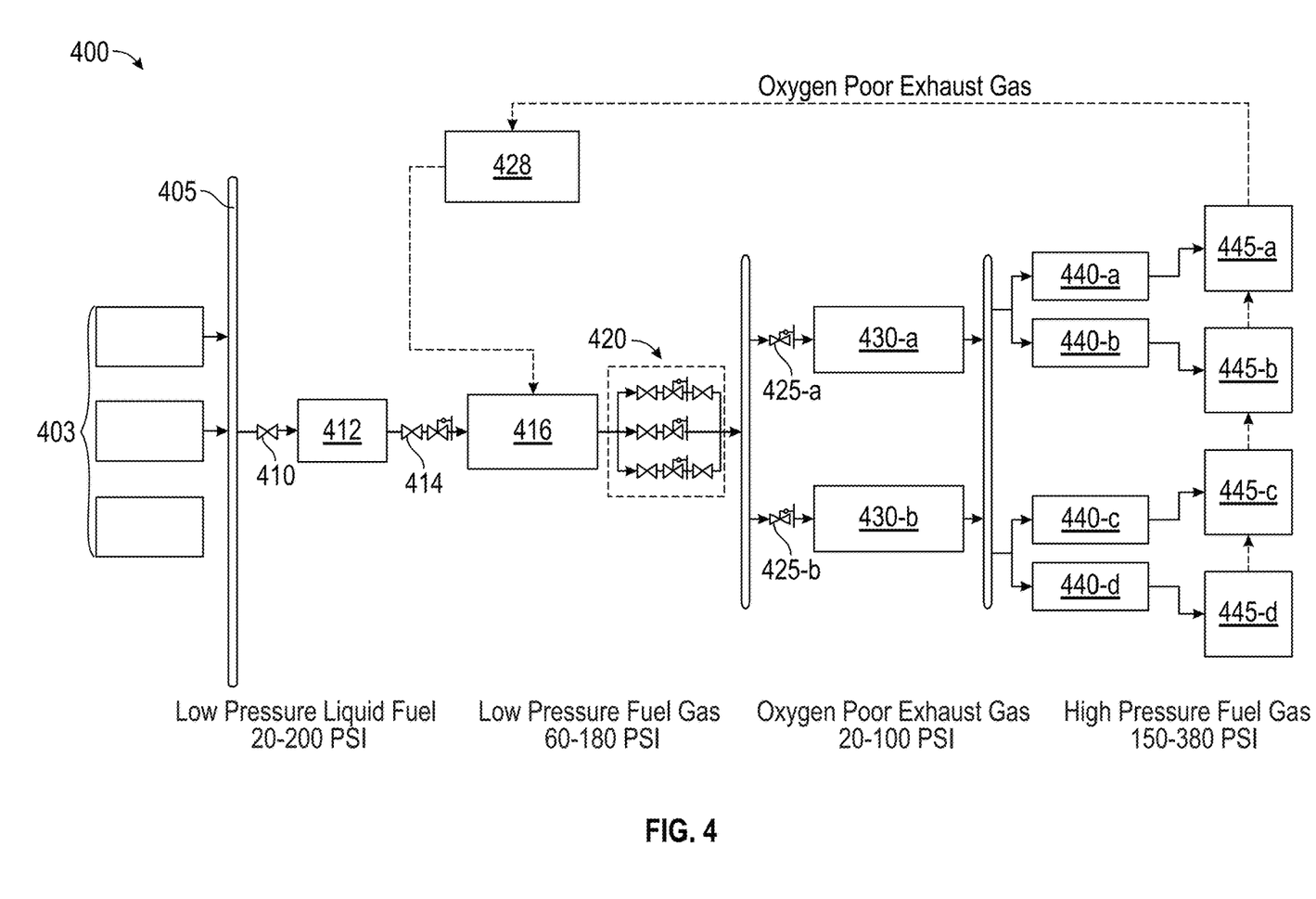
FIG. 4 is a schematic block diagram of an alternate example of a gas compression system having a liquid fuel vaporization system according to an embodiment of the disclosure.

Referring now to FIG. 4, shown in schematic block diagram form is another embodiment of a gas compression system 400 which provides oxygen-lean air to the fuel vaporization process. As illustrated in the embodiment shown in FIG. 4, gas compression system 400 can include a manifold 405 for connecting and unloading liquid fuel delivery tankers 403. In an alternate embodiment, a main gas supply line, for example as illustrated in an embodiment shown in FIG. 2, can extend along a lateral side of the system, allowing gas from the main gas supply line to flow through filtration vessels into the vaporization skid. In fluid communication with the manifold 405 is an optional fuel storage vessel 412, which can receive fluid from the liquid fuel delivery tankers 403 via shutoff valve 410. The storage vessel 412 can prevent downtime if there is an interruption in fuel deliveries. Fuel can be received at and stored in the storage vessel 412 in a low pressure liquid form in the range of 20-200 PSI in some embodiments.

Downstream from the fuel storage vessel 412, as part of the fuel vaporizing and premixing system, can be a fuel vaporization skid 416, which can receive liquid fuel and vaporize the liquid fuel into a gaseous state. In the gaseous state, the fuel can remain at a low pressure, in the range of 60-180 PSI, according to an embodiment.

Regulators can be in the form of a specialized unit containing multiple regulators and bypass or isolation valves, such as pressure regulator skid 420, or can be individual regulators 414, 425-a, 425-b spread throughout the compression system. Each piece of equipment can contain dedicated internal pressure regulators.

Valves 410 are optionally provided at the fuel inlets and outlets to each piece of equipment, and further optionally to parts of the internal plumbing to enable fuel to be shut off at any point in the vaporization and compression system. Some of these valves can be manual, while others can be actuated and controlled either digitally or by an automatic control system. Filtration units can also provide heating to the gaseous fuels. In an embodiment, these filtration units can heat the fuel mixture to 50 degrees Fahrenheit above the dew point of the fuel to allow further conditioning of the gas for the turbines and to allow the gas to remain mixed and uncondensed, and to combust properly in the combustion chamber.

Like the system 200 of FIG. 2, the gas compression system 400 of FIG. 4 can include gas compression units 430-a, 430-b, turbines 445-a, 445-b, 445-c, 445-d downstream of the gas compression units 430-a, 430-b, and filtration units 440-a, 440-b, 440-c, 440-d between the gas compression units 430-a, 430-b and turbines 445-a, 445-b, 445-c, 445-d. Unlike the system of FIG. 2, a three-phase separator is not provided downstream of the compressors in an embodiment illustrated in FIG. 4. However, the three-phase separators and sand trap(s) can be included in the embodiment illustrated in FIG. 4 if the fuel has a high amount of undesirable water or particulate matter.

In the embodiment illustrated in FIG. 4, oxygen-poor exhaust gas from the turbines 445-a, 445-b, 445-c, 445-d can be routed to the vaporization skid 416, where the exhaust gas can be mixed with the fuel. The exhaust gas regulates the energy content of the vaporized fuel by diluting the oxygen content of the air. In some embodiments, the oxygen poor exhaust gas can travel from the turbines 445-a, 445-b, 445-c, 445-d through an optional air compressor unit 428 before being mixed with the fuel at vaporization skid 416.

Figure 5:
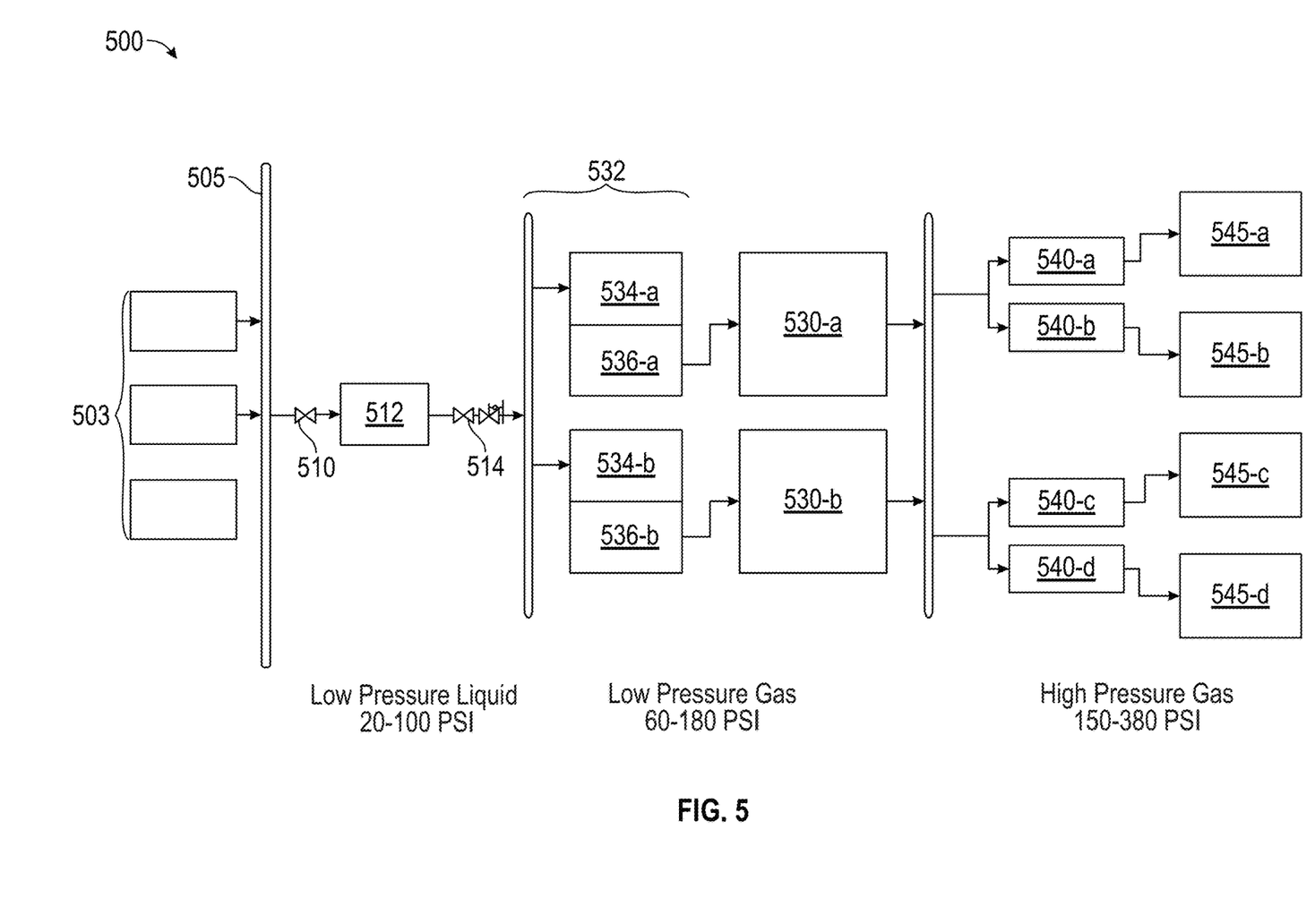
FIG. 5 is a schematic block diagram of another alternate example of a gas compression system with a liquid fuel vaporization system and that includes an oxygen separator according to an embodiment of the disclosure.

Another example of a gas compression system according to an embodiment is shown in block diagram schematic form in FIG. 5. In this example the gas compression system 500 includes a fuel vaporization system 532 with a dedicated liquid vaporization 534-a, 534-b and oxygen separation unit 536-a, 536-b for each compressor 530-a, 530-b. Further, in this embodiment, pressure regulation can be performed on vaporization trailers within the fuel vaporization system 532, such that external regulators can be optional. A high pressure gas manifold between the compressors 530-a, 530-b and the filtration units 540-a, 540-b, 540-c, 540-d is also optional, and can be present only if load sharing of the compressors 530-a, 530-b is desired.

As illustrated in the embodiment shown in FIG. 5, gas compression system 500 can include a manifold 505 for connecting and unloading liquid fuel delivery tankers 503. In an alternate embodiment, a main gas supply line, for example as illustrated in an embodiment shown in FIG. 2, can extend along a lateral side of the system, allowing gas from the main gas supply line to flow through filtration vessels. In fluid communication with the manifold 505 is an optional fuel storage vessel 512, which can receive fluid from the liquid fuel delivery tankers 503 via shutoff valve 510. The storage vessel 512 can prevent downtime if there is an interruption in fuel deliveries. Fuel can be received at and stored in the storage vessel 512 in a low pressure liquid form in the range of 20-200 PSI in some embodiments.

Regulators can be in the form of a specialized unit containing multiple regulators and bypass or isolation valves, such as the pressure regulator skid 320, 420 as illustrated in the embodiments shown in FIGS. 3 and 4, or can be individual regulators 514 spread throughout the compression system. Each piece of equipment can contain dedicated internal pressure regulators.

Valves 510 are optionally provided at the fuel inlets and outlets to each piece of equipment, and further optionally to parts of the internal plumbing to enable fuel to be shut off at any point in the vaporization and compression system. Some of these valves can be manual, while others can be actuated and controlled either digitally or by an automatic control system. Filtration units can also provide heating to the gaseous fuels. In an embodiment, these filtration units can heat the fuel mixture to 50 degrees Fahrenheit above the dew point of the fuel to allow further conditioning of the gas for the turbines and to allow the gas to remain mixed and uncondensed, and to combust properly in the combustion chamber.

Figure 6:
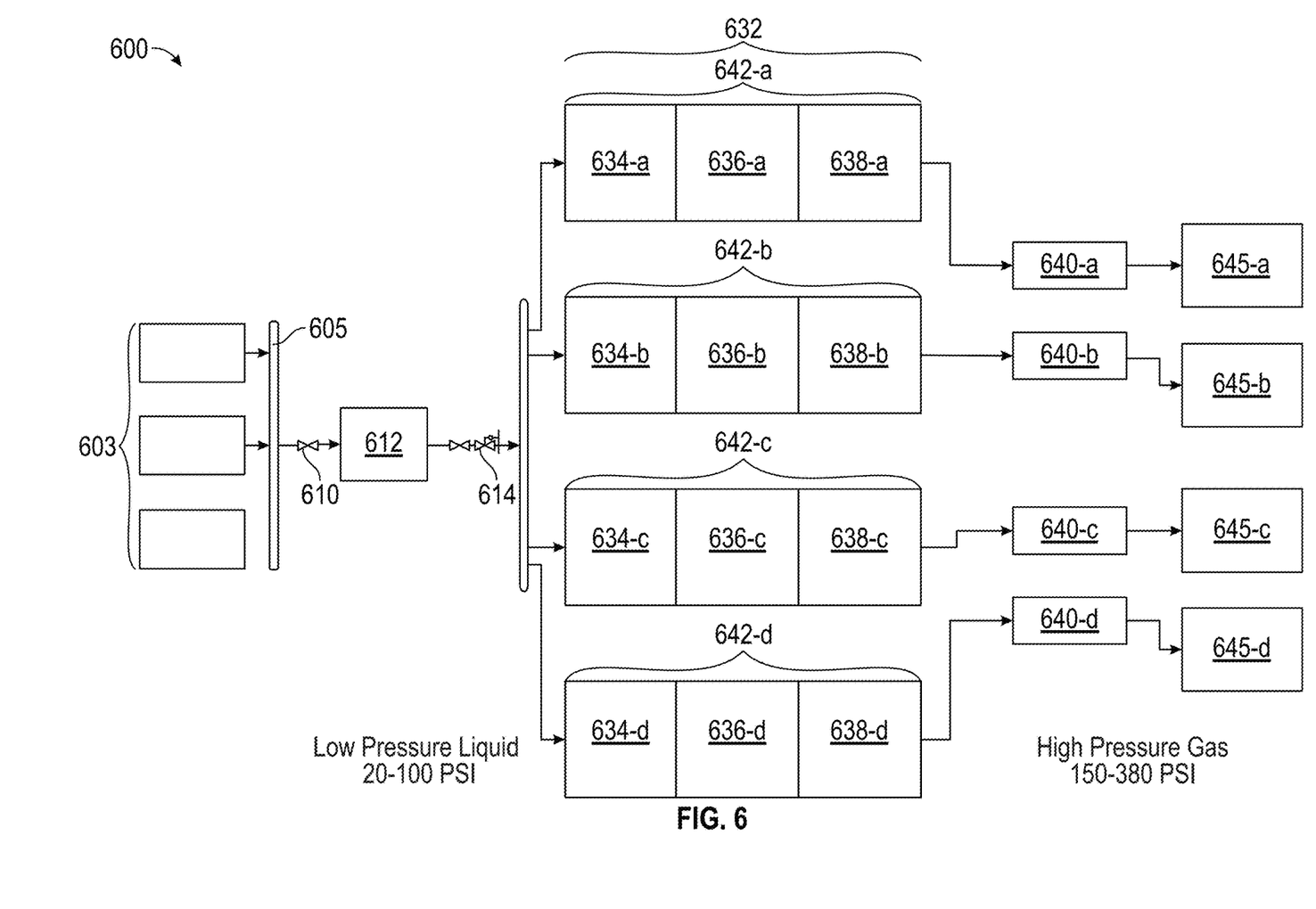
FIG. 6 is a schematic of an example of a gas compression system according to an embodiment of the disclosure.

FIG. 6 is another example of a gas compression system 600 according to an embodiment, shown in block diagram schematic form. Here, a gas vaporization and compression system 632 may include dedicated gas vaporization and compression units 642-a, 642-b, 642-c, 642-d provided for each turbine 645-a, 645-b, 645-c, 645-d. The dedicated gas vaporization and compression units 642-a, 642-b, 642-c, 642-d can each include an oxygen separator 634-a, 634-b, 634-*c*, 634-*d*, a vaporizer 636-*a*, 636-*b*, 636-*c*, 636-*d*, and a compressor 638-*a*, 638-*b*, 638-*c*, 638-*d*, respectively.

The modular approach depicted in FIG. 6 can have the flexibility of operating a different number of turbines, depending on a particular application. For example, the system can easily be modified to generate 5 MW (for a single turbine) or less power for a drilling rig, as well as being modified to operate five to six turbines, for example, that generate power for multiple locations or applications. The system of FIG. 6 can match the number of turbines with an anticipated power requirement, and thus can minimize unnecessary gas compression and vaporization capacity during operations requiring different numbers of turbine generators. Instead of a single turbine being supplied with compressed gas from a single compressor and vaporizer that are together capable of supplying multiple turbines, a single trailer can be employed to meet the demand of a single turbine. While not shown in FIG. 6, a compressor outlet manifold could be included to allow compressor load sharing between the turbines.

The vaporization system 632 can optionally handle liquid fuels, gaseous fuels, and any combination of liquids mixed with gaseous fuels. The vaporization system 632 can also separate the liquids from the gas, vaporize the liquid, then recombine the gaseous fuel with the vaporized fuel and lean-out the mixture with nitrogen rich air to create the correct lower heating value (LHV) and energy density of the new SNG mixture. As shown in FIG. 6, mobile fuel transports (liquid fuel delivery tankers) 603 can provide the liquid fuel supply through manifold 605, and the provided liquid fuel supply can be optionally stored in storage vessel 612. Optionally, liquid fuels can be supplied from a pipeline or alternatively from wet gas or mixed liquid/gaseous fuels.

If required, extra pressure regulation or fuel filtering can be applied to any embodiment. Fuel filtering can include three-phase separators and sand traps for liquid or gaseous fuels, as illustrated in the embodiment shown in FIG. 2. Regulators can be in the form of a specialized unit containing multiple regulators and bypass or isolation valves, such as the pressure regulator skid 220 of FIG. 2, or can be individual regulators 614 spread throughout the compression system. Each piece of equipment can contain dedicated internal pressure regulators.

Valves 610 are optionally provided at the fuel inlets and outlets to each piece of equipment, and further optionally to parts of the internal plumbing to enable fuel to be shut off at any point in the vaporization and compression system. Some of these valves can be manual, while others can be actuated and controlled either digitally or by an automatic control system. Filtration units can also provide heating to the gaseous fuels. In an embodiment, these filtration units can heat the fuel mixture to 50 degrees Fahrenheit above the dew point of the fuel to allow further conditioning of the gas for the turbines and to allow the gas to remain mixed and uncondensed, and to combust properly in the combustion chamber.

In an embodiment, the types of hydrocarbon-, hydrogen-, and alcohol-based fuel gases can be divided into three main categories: (1) gaseous fuels; (2) liquid fuels; (3) and solid fuels. In a non-limiting example of operation, fuel types can be converted to a gaseous state prior to being delivered to the turbines. For liquid fuels the process can include vaporization as described previously. Solid fuels can be converted into a gaseous state by gasification, such as through pyrolysis. One example of pyrolysis can include converting material containing carbon (such as coal or biomass such as peat, wood, or other human waste products) into longer hydrocarbon chains by exposing solid fuel sources to high heat and an oxygen-rich environment, causing the solid fuel sources to partially react or combust. The resulting collected gas—generally referred to as syngas—can be combusted as a fuel source. Syngas, constituents of which include carbon monoxide (CO) or carbon dioxide ($CO_2$) and hydrogen ($H_2$), can be methanized to increase combustibility, which in turn increases the quality and energy of the syngas. Syngas can optionally be converted to methane ($CH_4$) and water ($H_2O$) with a methanation process. Syngas can be obtained from industrial sites and methanized on site using a methanation skid similar in placement to the vaporization equipment. The upgraded syngas can be referred to as SNG and can be supplied to the gas compression system to fuel the turbines.

Examples of hydrocarbon fuels that are naturally in a vaporized state include methane, ethane, propane, and butane. Some of these fuels can be easily converted to liquids at different temperatures or pressures. Natural gas is a fuel source that is commonly used to power the turbines. A normal composition of natural gas is approximately 75-95% methane, with the other portion being composed of ethane, nitrogen, propane, carbon dioxide, butane, oxygen, and traces of other hydrocarbons or impurities. The composition of natural gas varies widely based on region (i.e., where it was extracted), depth (i.e., the depth at which it was extracted), and geological maturity (i.e., how long the hydrocarbon had been exposed to heat and pressure underground).

Hydrogen gas can also be used as a fuel source, despite the lack of a carbon atom precluding hydrogen gas from being designated a hydrocarbon. As a fuel source, hydrogen in the form of $H_2$—also called deuterium—is used. Deuterium can also be used in liquid form ($LH_2$) in conjunction with the vaporization skid added to the gas compression and power generation system. Anhydrous ammonia ($NH_3$) in liquid or gas form can also be used as a potential fuel source. Similarly to CNG conversions, $NH_3$ can be used in most internal combustion engines with very little modification.

For the purposes of discussion herein, liquid hydrocarbon fuels can be fuels that are in a liquid state at standard temperature and pressure. Liquid hydrocarbon fuels can also include subcooled gaseous hydrocarbons (sometimes cooled cryogenically), and/or compressed into a liquid form (such as LNG). As described above, liquid hydrocarbon fuels can be vaporized upstream of the turbines. Alcohols such as methanol, ethanol, butanol, and propanol, as well as many others, can also be used as fuel. Alcohol fuels, such as methanol or ethanol alone, can be used in their pure form, or can be burned as a mixture, such as ecalene, which is several different alcohol molecules mixed together.

Alcohol and hydrocarbon mixes can also be utilized. Such mixes include the previously mentioned ethanol-gasoline mixes such as E10 gasohol, E85, and the other variations. Other options for liquid fuel sources can include TEL, known as Tetraethyl lead ($(CH_3CH_2)_4Pb$), or leaded gasoline. TEL is an octane booster used in racing fuel and could be vaporized and used to fuel the turbines or to enrich other vaporized or gaseous fuel sources. Some types of fuel gas that can be utilized with the proposed system or with future development can include gaseous fuels, which include: gaseous hydrocarbons, such as natural gas (mostly methane), compressed natural gas (CNG), methane (an example of an alkane hydrocarbon), butyne (an example of an alkyne hydrocarbon), acetylene (an example of an alkene hydrocarbon), ethylene, ethane, biogas (produced by the fermentation of biodegradable materials, such as anaerobic digestions by bacteria) such as landfill gas, digested gas, and renewable natural gas (upgraded biogas), SNG (substitute natural gas or synthetic natural gas) such as BioSNG (SNG made from biomethane produced through anaerobic digestion or gasification and methanation) and methanized or upgraded syngas, and hydrogen gas ($H_2$, deuterium); vaporized liquid fuels such as alcohol or ethanol (an example of a grain derived alcohol), methanol (an example of a cellulose-derived alcohol), and pentanol (an example of a hydrocarbon-derived alcohol), liquid hydrocarbons such as liquefied natural gas (LNG) and liquid petroleum gas (LPG), both of which are alkane hydrocarbons, butane, propane, octane, pentane, hexane, kerosene, fuel oil, naphtha, gasoline, leaded gasoline, diesel, fuel oil, TEL, liquid hydrogen (known as $LH_2$), ammonia ($NH_3$), gasified solid hydrocarbon fuels, such as syngas (also called synthesis gas, producer gas, or town gas, and needs to undergo methanation before it is considered a true hydrocarbon fuel source), water gas (made by passing steam over superheated solid carbon rich fuel), coal gas (including mond gas and coal gas that is a byproduct of the coking process), wood gas (produced from biomass by using pyrolysis), oil shale gas (produced from solid shale by using pyrolysis), and blau gas (derived from waste naphtha).

Another alternative fuel can include dimethyl ether, which is an isomer of ethanol. Ether is a molecule similar to alcohol but with an alkyl group as part of the molecular formula. Ethers are currently being studied as possible future replacements of conventional fuels, and dimethyl ether specifically can be used as a replacement for propane.

An alternative to using an air separator to reduce the oxygen content in the inert gas for regulating and carrying the vaporized fuel can be provided by the turbines. The exhaust from the turbines themselves can be used, or the exhaust from the black start generator (diesel powered standby generator) can be used to lean-out the vaporized fuel mixture. The term "skid" is often used to describe the various pieces of equipment; these units can be skid-mounted, trailerized, or part of a bodyload tractor.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

What is claimed is:

1. A hydraulic fracturing system for fracturing a subterranean formation comprising:
    an electric pump fluidly connected to a well associated with the subterranean formation and powered by an electric motor;
    a turbine generator electrically coupled to electric pump so as to generate electricity for use by the electric pump;
    a gas compression system coupled to the turbine generator so as to provide fuel for use by the turbine generator; and
    least one of a liquid fuel source or a solid fuel source to supply fuel to the gas compression system.

2. The system of claim 1, further comprising a variable frequency drive connected to the electric motor to control the speed of the electric motor.

3. The system of claim 1, wherein each of the liquid fuel source and the solid fuel source comprise at least one of a hydrogen-based, hydrocarbon-based, or alcohol-based fuel source, or any combination thereof.

4. The system of claim 3, wherein the liquid fuel source comprises any of a kerosene, methanol, No. 2 fuel oil, hydrogen, liquefied natural gas (LNG), substitute natural gas (SNG), liquid hydrocarbon, or ammonia fuel source, or any combination thereof.

5. The system of claim 3, wherein the solid fuel source comprises any of a wood gas or coal gas fuel source, or a combination thereof.

6. The system of claim 1, further comprising an inert gas source, wherein an inert gas is provided to regulate the liquid fuel source or the solid fuel source prior to providing fuel for use by the turbine generator.

7. The system of claim 1, wherein the inert gas source comprises at least one of an oxygen-lean or a nitrogen-rich inert gas source, or a combination thereof.

8. The system of claim 1, further comprising:
    at least one filter configured to filter at least one of particulates, water, or condensate, or a combination thereof, from at least one of the liquid fuel source and the solid fuel source.

* * * * *